United States Patent Office 3,702,256
Patented Nov. 7, 1972

3,702,256
MARINE ANTIFOULING ADDITIVE
Louis M. Stevens, Ruskin, Fla., assignor to L. M. Stevens Corporation, Ruskin, Fla.
No Drawing. Filed Apr. 26, 1971, Ser. No. 137,709
Int. Cl. C09d 5/14, 5/16
U.S. Cl. 106—15 AF                   2 Claims

ABSTRACT OF THE DISCLOSURE

A marine anti-fouling additive to enhance an existent anti-fouling paint formulation or to make an existent paint formulation anti-fouling consisting of said paint formulation and 30% to 60% by weight of copper naphthenate and 0.5% to 5.0% by weight of formaldehyde.

BACKGROUND OF THE INVENTION

Field of the invention

This invention relates to a marine anti-fouling or "bottom" paint composition and more particularly to a marine anti-fouling paint composition which contains copper naphthenate and formaldehyde whereby the bottom of the boat hull remains free of barnacles and the like for periods of time far in excess of ordinary bottom paint.

Description of the prior art

Many marine organisms act on boat hulls to cause fouling. Algae, acorn shells, goose mussels, barnacles, tubeworms, moss, teredos or shipworms, limnoria, martesia, sphaeroma, oysters, bryozoans, tunicates, and other organisms all contribute to the fouling of a boat hull or "bottom." They either destroy, corrode or merely attach themselves to the underwater surface. And they do so rather quickly. Indeed, in tropical waters, a boat hull may be fouled within a week, whereby appearance, speed, etc. is deleteriously affected.

The industry has resorted to the use of anti-fouling coating compositions mainly involving copper or mercury compounds which apparently are poisonous to the marine organisms that cause fouling. The following U.S. patents reveal typical formulations: 3,100,719; 3,214,281; 3,234,032; 3,331,693; 3,332,789; 3,337,352. Unfortunately, the anti-fouling effect of such coating composition is transitory after several months to a half year. It is usually necessary to recoat the bottom periodically to obtain the benefit of the coating composition. This involves dry docking, scraping and repainting, all at considerable expense and effort.

SUMMARY OF THE INVENTION

Objectives

An object of this invention is to provide a novel anti-fouling paint composition.

Another object is to provide a novel additive composition to anti-fouling paint compositions which enhances their anti-fouling ability.

Still another object is to provide a novel anti-fouling additive to ordinary paint.

A further object is to provide an anti-fouling additive which is easy to incorporate into ordinary paint or existent anti-fouling paint.

A still further object is to provide an anti-fouling additive to paint or existent anti-fouling paint which is economical.

Other objects of the invention will in part be obvious and will in part appear hereinafter.

Broad statement of the invention

The above objectives are accomplished by the addition of copper naphthenate and formaldehyde to an enamel or an existent anti-fouling paint. More particularly, when 30% to 60% by weight of copper naphthenate and 0.5% to 5.0% by weight formaldehyde are added to an existent anti-fouling paint, a synergistic enhancement of the anti-fouling effect is obtained. When added to ordinary paint, the paint becomes an anti-fouling paint of prolonged anti-fouling ability.

The invention accordingly comprises a composition of matter possessing the characteristics, properties, and the relation of components which will be exemplified in the composition hereinafter described, and the scope of the invention will be indicated in the claims.

For a fuller understanding of the nature and objects of the invention, reference should be had to the following detailed examples:

DETAILED DESCRIPTION OF THE PREFERRED EMBODIMENTS

EXAMPLE I

The following anti-fouling paint is formulated of a:

| Vehicle: | Percent by wt. |
|---|---|
| Menhaden oil, rosin | 39.43 |
| Aliphatic hydrocarbons and driers | 60.40 | and a

| Pigment: | Percent by wt. |
|---|---|
| Stearates | .02 |
| Cuprous oxide | 65.20 |
| Zinc oxide | 18.50 |
| Hydrous aluminum silicate | 17.28 | using a ball mill to obtain the desired degree of dispersion. To the above paint formulation is added:

| | Percent |
|---|---|
| Copper naphthenate | 99.00 |
| Formaldehyde | 1.00 |
| | 100.00 |

Before applying the above to a boat bottom, all loose and peeling paint is removed therefrom. Loose wood is repaired and rotted wood is removed and replaced. Open seams are caulked or corked. The formulation is applied as is. But if lower consistency is desired, clean mineral spirits may be added. Two coats are recommended for longer protection.

As a comparison, another boat bottom is prepared similarly and simultaneously, but without the copper naphthenate and formaldehyde in the paint composition. The bottom becomes fouled in about four months whereas with the additives of this invention, the bottom remains clean and without marine growth for more than one year.

EXAMPLE II

Another anti-fouling paint is formulated of a:

| | Percent by wt. |
|---|---|
| Vehicle | 41.8 |
| Chlorinated biphenyl | 11.7 |
| Water white rosin | 36.1 |
| Pine oil | 2.9 |
| Volatile petroleum solvent | 48.8 |
| Methanol | 0.5 | and a

| | Percent by wt. |
|---|---|
| Pigment | 58.2 |
| Zinc oxide | 4.8 |
| Red iron oxide | 19.2 |
| Cuprous oxide | 48.0 |
| Magnesium silicate | 27.0 |
| Bentone 38 (organophilic bentonite) | 1.0 | using a ball mill to obtain the desired degree of dispersion.

To the above paint formulation is added 50% by weight of:

| | Percent by wt. |
|---|---|
| Copper naphthenate | 99.5 |
| Formaldehyde | 0.5 |

A boat bottom is prepared as in Example I and then the resultant formulation of this example is applied thereto. After one year in Florida waters, the bottom will still be free of any growth.

EXAMPLE III

Still another anti-fouling paint is formulated of a:

| | Percent by wt. |
|---|---|
| Vehicle | 42.9 |
| Chlorinated biphenyl | 13.4 |
| Water white rosin | 41.2 |
| Pine oil | 3.4 |
| Volatile petroleum solvent | 41.5 |
| Methanol | 0.5 | and a

| | |
|---|---|
| Pigment | 57.1 |
| Zinc oxide | 4.8 |
| Red iron oxide | 19.2 |
| Cuprous oxide | 48.0 |
| Magnesium silicate | 27.0 |
| Bentone 38 (organophilic bentonite) | 1.2 | using a ball mill to obtain the desired degree of dispersion.

To the above paint formulation is added 50% by weight of:

| | Percent by wt. |
|---|---|
| Copper naphthenate | 98.0 |
| Formaldehyde | 2.0 |

The above formulation is applied to a boat bottom, prepared as in Example I and after fourteen months, it will still be free of growth.

EXAMPLE IV

The following paint composition is formulated by mixing and kneading in a ball mill until the desired degree of dispersion is obtained:

| | Percent by wt. |
|---|---|
| Rosin | 15.0 |
| Vinyl chloride resin (UCC: Vinylite Resin VYHH) | 37.0 |
| Tricresyl phosphate | 4.0 |
| Titanium dioxide | 10.0 |
| Aluminum stearate | 0.5 |
| Methyl isobutyl ketone | 16.5 |
| Xylene | 17.0 |

To 100 parts of the above formulation is added 40 parts of:

| | Percent by wt. |
|---|---|
| Copper naphthenate | 96.0 |
| Formaldehyde | 4.0 |

The resultant composition is applied to a cleaned boat bottom. The bottom remains free of marine growth for more than one year.

EXAMPLE V

The following paint composition is formulated by mixing and kneading in a ball mill until the desired degree of dispersion is obtained:

| | Percent by wt. |
|---|---|
| Rosin | 26.0 |
| Oil soluble phenolic resin | 5.0 |
| Coal tar | 10.0 |
| Titanium dioxide | 13.0 |
| Talc | 15.0 |
| Solvent naphtha | 31.0 |

To 100 parts of the above formulation is added 60 parts of:

| | Percent by wt. |
|---|---|
| Copper naphthenate | 99.0 |
| Formaldehyde | 1.0 |

The resultant composition is applied to a cleaned boat bottom. The bottom remains free of marine growth for more than nine months.

EXAMPLE VI

The following paint composition is formulated by mixing and kneading in a ball mill until the desired degree of dispersion is obtained:

| | Percent by wt. |
|---|---|
| Rosin | 19.0 |
| Asphalt | 3.0 |
| Coal tar | 7.0 |
| Iron oxide | 15.0 |
| Cuprous oxide | 20.0 |
| Baryte | 16.0 |
| Solvent naphtha | 20.0 |

To 100 parts of the above formulation is added 55 parts of:

| | Percent by wt. |
|---|---|
| Copper naphthenate | 97.5 |
| Formaldehyde | 2.5 |

The resultant composition is applied to a cleaned boat bottom. The bottom remains free of marine growth for more than eleven months.

EXAMPLE VII

The following paint composition is formulated by mixing and kneading in a ball mill until the desired degree of dispersion is obtained:

| | Percent by wt. |
|---|---|
| Rosin | 23.0 |
| Bodied linseed oil | 8.0 |
| Iron oxide | 15.0 |
| Cuprous oxide | 15.0 |
| Mercuric oxide | 2.0 |
| Calcium carbonate | 17.0 |
| Mineral spirit | 20.0 |

To 100 parts of the above formulation is added 50 parts of:

| | Percent by wt. |
|---|---|
| Copper naphthenate | 95.0 |
| Formaldehyde | 5.0 |

The resultant composition is applied to a cleaned boat bottom. The bottom remains free of marine growth for more than fourteen months.

EXAMPLE VIII

The following paint composition is formulated by mixing and kneading in a ball mill until the desired degree of dispersion is obtained:

| | Percent by wt. |
|---|---|
| Rosin | 17.0 |
| Chlorinated rubber (Hercules Powder Co.: Parlon) | 13.0 |
| Methyl dihydro-abietate (Hercules Powder Co.: Hercolyn) | 27.0 |
| Titanium dioxide | 10.0 |
| Talc | 6.0 |
| Baryte | 4.0 |
| Aluminum stearate | 0.7 |
| Solvent naphtha | 22.3 |

To 100 parts of the above formulation is added 50 parts of:

| | Percent by wt. |
|---|---|
| Copper naphthenate | 97.0 |
| Formaldehyde | 3.0 |

The resultant composition is applied to a cleaned boat bottom. The bottom remains free of marine growth for more than ten months.

EXAMPLE IX

The following alkyd type coating composition is formulated:

| | Parts by wt. |
|---|---|
| Titanium dioxide | 349.55 |
| Calcium silicate | 58.08 |
| Bentonite | 3.58 |
| 70% glyceryl phthalate resin modified with 64–75% oil and 23–28% phthalic anhydride in mineral spirits | 374.08 |
| Cobalt naphthenate | 4.80 |
| 40% glyceryl phthalate alkyd with the polyamide prepared from dimerized linseed oil fatty acid and diethylene triamine in mineral spirits | 64.90 |
| Manganese naphthenate | 15.70 |
| Mineral spirits | 122.55 |

To 100 parts of the above is added 50 parts of:

| | Percent by wt. |
|---|---|
| Copper naphthenate | 96.0 |
| Formaldehyde | 4.0 | and the resultant formulation is applied to a cleaned boat bottom. It will show anti-fouling ability for at least twelve months.

EXAMPLE X

The following acrylic type coating composition is formulated:

| | Parts by wt. |
|---|---|
| Titanium dioxide | 13.9 |
| Aluminum silicate | 13.9 |
| Methyl methacrylate - butyl methacrylate copolymer | 13.9 |
| Mineral spirits | 5.2 |

To 100 parts of the above composition is added 50 parts of:

| | Percent by wt. |
|---|---|
| Copper naphthenate | 97.0 |
| Formaldehyde | 3.0 | and the resultant formulation is applied to a cleaned boat bottom. It will show anti-fouling for at least ten months.

To any of the above paint formulations may be added coloring pigments; such as ferric oxide, ultramarine blue, cyanine green, phthalocyanine blue, zinc chromate, barytes, lithopone, litharge, red lead, whiting, rutile titanium dioxide, bone black, red iron oxide and others.

Solvents and thinners, such as mineral spirits, xylene, turpentine, benzene, ether, chloroform, may also be added to decrease the viscosity of the paint formulation so that it may be more easily applied by brush, spray gun, roller and the like.

As should be obvious to those skilled in the art, the ingredients indicated above and in the examples may be varied over wide limits, depending upon the base vehicle used and the surface to which the formulation is to be applied and the manner in which it is to be applied.

With respect to the unique ingredients of this invention which accomplish the synergistic anti-fouling ability, the copper naphthenate may have a concentration range of 40% to 60% by weight and the formaldehyde, a concentration range of 0.5% to 5% by weight.

It will thus be seen that the objects set forth above, among those made apparent from the preceding description, are efficiently attained, and, since certain changes may be made in the above composition of matter without departing from the scope of the invention, it is intended that all matter contained in the above description shall be interpreted as illustrative and not in a limiting sense.

Particularly it is to be understood that in said claims, ingredients or compounds recited in the singular are intended to include compatible mixtures of such ingredients wherever the sense permits.

Now that the invention has been described, what is claimed is:

1. A marine anti-fouling additive to enhance an anti-fouling paint formulation or to make a paint formulation anti-fouling consisting essentially of copper naphthenate and formaldehyde.

2. The additive of claim 1 wherein the formaldehyde comprises 0.5% to 5% by weight of the additive.

References Cited

UNITED STATES PATENTS

| | | | |
|---|---|---|---|
| 2,112,412 | 3/1938 | Wetchler | 106—15 AF |
| 3,049,471 | 8/1962 | Behr | 106—15 AF X |
| 3,111,456 | 11/1963 | Hochman et al. | 106—15 AF X |
| 3,148,110 | 9/1964 | McGahen | 106—15 AF X |
| 3,100,719 | 8/1963 | Dunn et al. | 106—15 AF X |

JOAN B. EVANS, Primary Examiner

U.S. Cl. X.R.

106—16, 17, 18, 264, 310